July 24, 1934.  W. B. DAMSEL  1,967,467
JOINT FOR CONCRETE AND PLASTIC PIPES
Filed Feb. 4, 1932  2 Sheets-Sheet 1
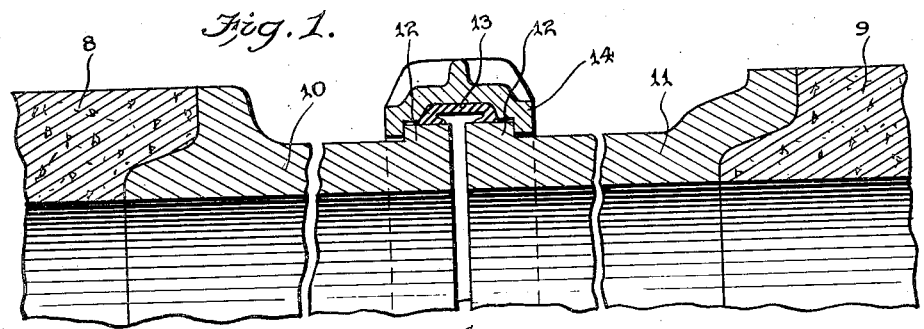
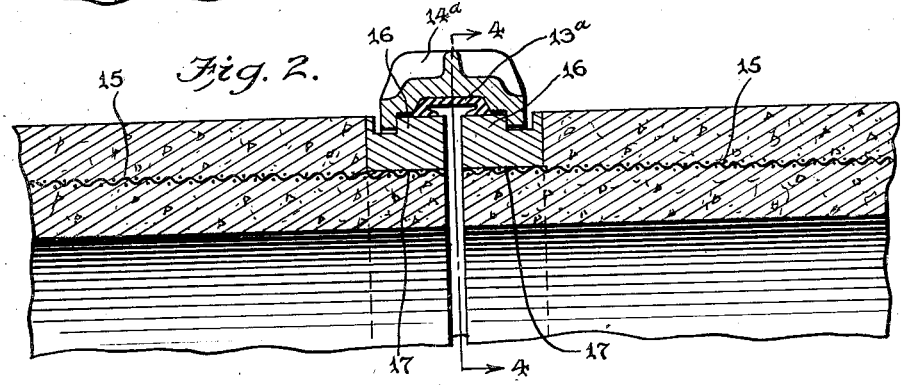
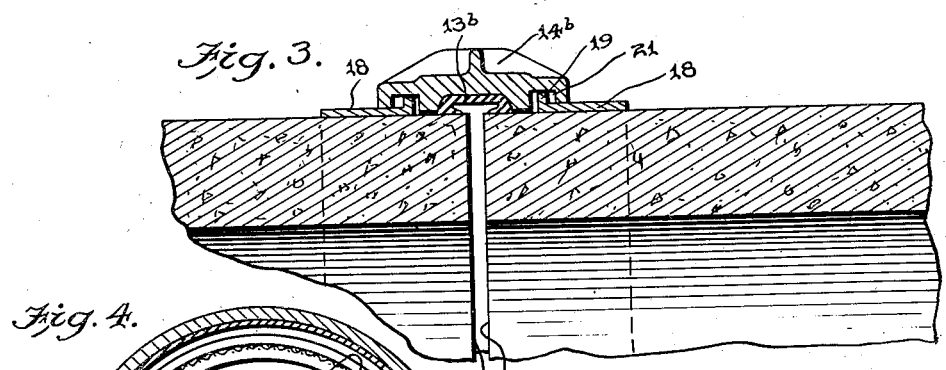
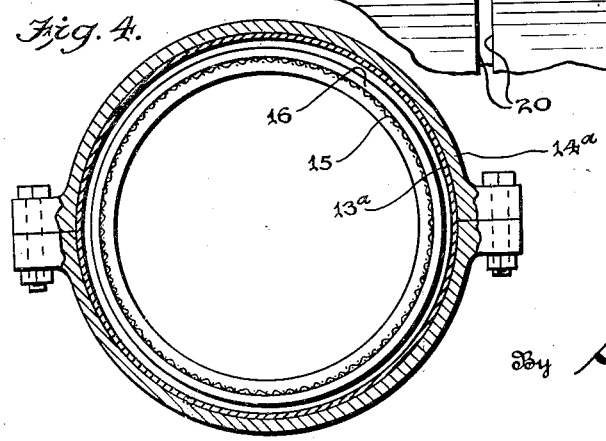
Inventor
William B. Damsel,
By Seymour & Bright
Attorneys July 24, 1934.  W. B. DAMSEL  1,967,467
JOINT FOR CONCRETE AND PLASTIC PIPES
Filed Feb. 4, 1932  2 Sheets-Sheet 2
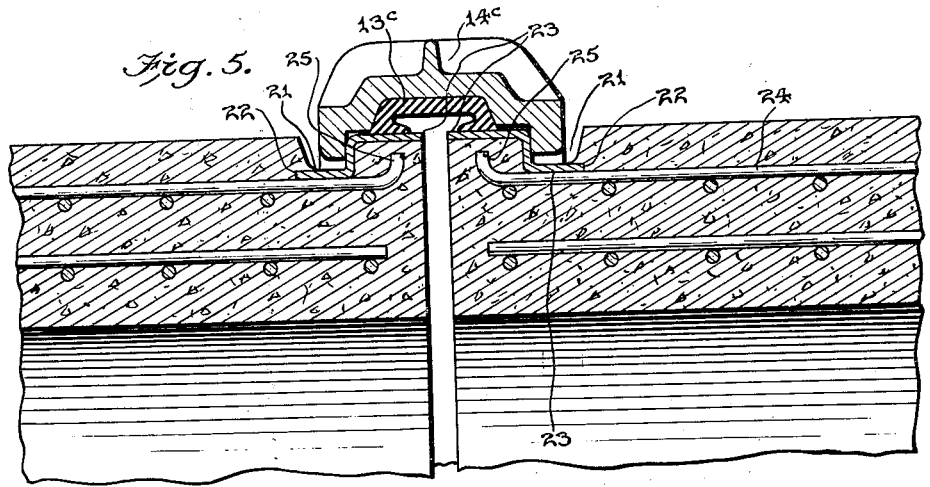
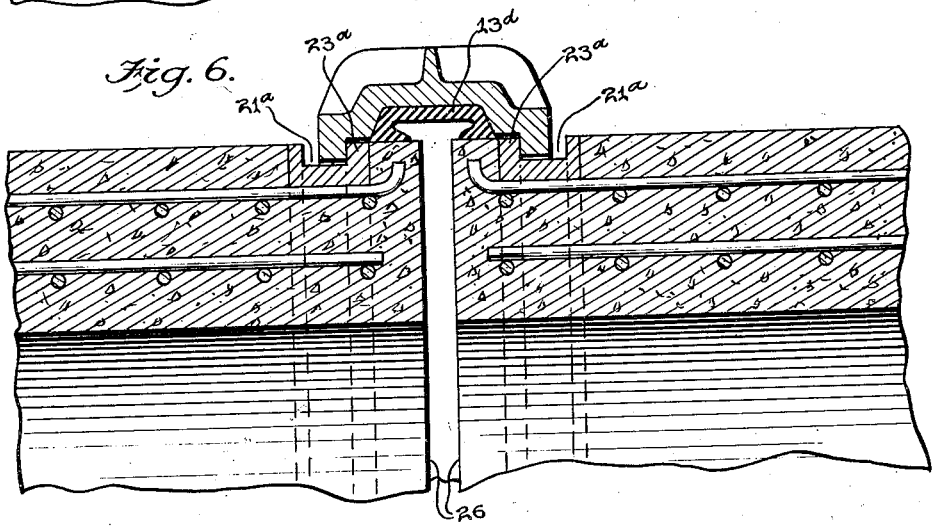
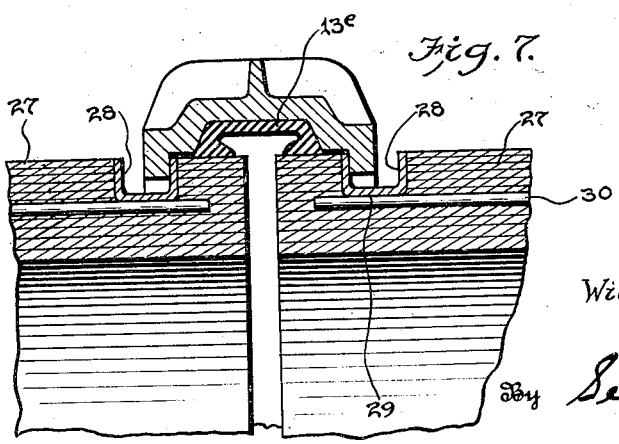
William B. Damsel, Inventor
By Seymour & Bright
Attorneys Patented July 24, 1934

1,967,467

UNITED STATES PATENT OFFICE 1,967,467

JOINT FOR CONCRETE AND PLASTIC PIPES

William B. Damsel, New York, N. Y.

Application February 4, 1932, Serial No. 590,973

1 Claim. (Cl. 72—53)

This invention relates to improvements in pipe couplings, and more especially to novel means for connecting the ends of pipes formed of concrete or other plastics, such as rubber and resin compounds, asbestos, impregnated paper and cloth.

One of the objects of the invention is to provide such pipes with means to facilitate the coupling of the same by a known type of coupling device including a housing and a channel-shaped packing ring.

Another object is to furnish such a device in which metal ferrules are anchored to the ends of the pipes and connected, if desired, to metal reinforcements of the pipes by means of welded joints or the like.

A still further object is to provide such a construction in which end portions of the metal reinforcements of the pipes act to prevent end portions of the pipes from breaking away from the bodies of the pipes.

A still further object is to supply coupling constructions of these types, in which the metal ferrules of the pipes are so arranged relatively to the packing ring that fluid within the pipe line cannot reach the metal ferrules and corrode the same.

With the foregoing objects outlined and with other objects in view which will appear as the description proceeds, the invention consists in the novel features hereinafter described in detail, illustrated in the accompanying drawings, and more particularly pointed out in the appended claim.

Referring to the drawings,

Fig. 1 is a longitudinal sectional view of a portion of a pair of pipe ends provided with one form of the improved coupling means.

Figs. 2 and 3 are similar views of modifications.

Fig. 4 is a transverse sectional view of the complete construction on a reduced scale, and taken on the line 4—4 of Fig. 2.

Figs. 5 to 7 inclusive are views similar to Fig. 1, but illustrating further modifications.

In the drawings, 8 and 9 designate portions of pipes formed of concrete or other plastic materials. For the purpose of coupling such pipes, I provide each end of the same with a metal ferrule 10 of the type connected to the pipe 8, or of the kind 11 connected to the pipe 9. In this embodiment, the pipes are simply connected to the ferrules by friction joints when the pipes are molded. Each ferrule has at its end an annular shoulder 12, and the space between these shoulders is spanned by a known type of channel-shape packing ring 13 that is secured in place by a housing 14 which may be formed of metal and may be of the half collar or split construction shown in Fig. 4.

If the pipes are provided with reinforcements formed of reticulated metallic fabric 15, as shown in Fig. 2, the metal ferrules 16 may be of the types shown in this figure, but in this case, the ferrules are joined to the fabric 15 by spot welding along the lines 17 for the purpose of securely connecting the ferrules to the fabric by welded joints. Here also the channel-shaped packing ring 13a, and the metallic housing 14a may be of the type shown in Fig. 1.

In the modification shown in Fig. 3, metal ferrules 18 may be of split construction, and may be joined to the pipes by bolts like that indicated in Fig. 4; and in this instance, each ferrule has an outwardly projecting annular flange 19, which is spaced from the extremity 20 of the pipe. Here also the housing 14b is modified to provide internal annular grooves 21 to interlock with the flanges 19. It will be noted in this embodiment, the edges of the channel-shaped packing ring 13b rest on the peripheries of the pipe between the ends 20 and the flanges 19, and consequently, the fluid flowing through the pipe line is prevented from reaching any of the metal of the connecting parts. Obviously, this is a great advantage in the transportation of corrosive fluids.

In the modification shown in Fig. 5, the pipes are provided near their ends with external annular grooves 21, into which extend the inner portions 22 of substantially Z-shaped metal ferrules 23. These inner portions 22 are preferably welded at 23 to longitudinal metal rods 24 forming portions of the reinforcements within the pipes, and it will be noted that the ends of the rods are bent outwardly as at 25 to form reinforcements within the end portions of the pipe, and to prevent the end portions from breaking away due to any strains placed on the ferrules 23. In this embodiment, I may employ a conventional annular metal housing 14c of split construction, and a channel-shaped packing ring 13c of unbroken form.

The construction illustrated in Fig. 6 is similar to that shown in Fig. 5, with the exception that the grooves 21a are formed in the metal ferrules 23a instead of in the plastic material of the pipes, and here also the joint is of the non-corrosive type, due to the fact that the packing ring 13d rests directly on the peripheries of the pipes, and is arranged between the ferrules and the extremities 26 of the pipes.

Fig. 7 shows the application of the joint to pipes 27 formed of wrapped paper or cloth. In this example, pressed steel channel-shaped rings 28 are embedded in the peripheral portions of the pipes, and are welded at 29 to the reinforcing rods 30. Here also the edges of the packing ring 13e rest upon the peripheries of the pipes, and block off the fluid flowing through the pipe line from the metal ferrules to prevent corrosion or the like.

It will be manifest from the foregoing that if the metal end or ferrule is spot welded or riveted to the reinforcing mesh or bars contained within the pipe, the ferrule will be prevented from pulling away from the pipe end when force is exerted. Furthermore, the constructions are such that if desired, the metal ferrules may be blocked off from the interior of the pipes by means of the packing ring, and therefore, the pipe line may be employed for transporting corrosive fluids.

While I have disclosed what I now consider to be preferred embodiments of the invention in such manner that it may be readily understood by those skilled in the art, I am aware that changes may be made in the details disclosed, without departing from the spirit of the invention, as expressed in the claim.

What I claim and desire to secure by Letters Patent is:

A pipe formed of plastic material and having an internal metal reinforcement, and a metallic ferrule surrounding the end portion of the pipe and secured to the internal reinforcement by welded joints, said ferrule forming an annular groove surrounding the pipe and adapted to receive the flange of a pipe joint collar, the internal reinforcement having an end portion projecting outwardly in the plastic material of the pipe and positioned between the ferrule and the extremity of the pipe, said ferrule being of substantially Z shaped cross section and having a portion surrounding the extremity of the pipe.

WILLIAM B. DAMSEL.